(12) United States Patent
Feil

(10) Patent No.: US 7,075,195 B2
(45) Date of Patent: Jul. 11, 2006

(54) ELECTRICAL SAFETY LOCKOUT MECHANISM FOR POWER TOOLS AND OTHER HAZARDOUS MACHINERY

(75) Inventor: Thomas E. Feil, Pound Ridge, NY (US)

(73) Assignee: Safestart System, LLC, Westport, CT (US)

( * ) Notice: Subject to any disclaimer, the term of this patent is extended or adjusted under 35 U.S.C. 154(b) by 463 days.

(21) Appl. No.: 10/342,001

(22) Filed: Jan. 14, 2003

(65) Prior Publication Data
US 2003/0133239 A1    Jul. 17, 2003

Related U.S. Application Data

(60) Provisional application No. 60/348,788, filed on Jan. 14, 2002.

(51) Int. Cl.
*H01H 9/54* (2006.01)

(52) U.S. Cl. .............. 307/142; 307/125; 307/126; 307/140

(58) Field of Classification Search .......... 307/142
See application file for complete search history.

(56) References Cited

U.S. PATENT DOCUMENTS

| | | | |
|---|---|---|---|
| 1,994,900 A | 3/1935 | Shand | 172/289 |
| 2,351,649 A | 6/1944 | Wintermute et al. | 82/2 |
| 3,064,162 A | 11/1962 | Savell | 317/13 |
| 3,327,197 A | 6/1967 | Marquis | 318/430 |
| 3,958,164 A | 5/1976 | Hess | 318/431 |
| 3,962,694 A | 6/1976 | Calia et al. | 340/267 R |
| 4,258,368 A * | 3/1981 | Arnold et al. | 318/782 |
| 4,278,371 A | 7/1981 | Meyer | 408/76 |
| 4,345,145 A | 8/1982 | Norwood | 219/492 |
| 4,380,412 A | 4/1983 | Walsh | 409/314 |
| 4,466,040 A | 8/1984 | Barthel et al. | 361/92 |
| 4,493,986 A | 1/1985 | Carter et al. | 219/85 D |
| 4,528,437 A | 7/1985 | Burnett et al. | 219/85 CA |
| 4,628,233 A | 12/1986 | Bradus | 318/306 |
| 4,636,961 A | 1/1987 | Bauer | 364/474 |
| 4,847,721 A | 7/1989 | Nothofer et al. | 361/23 |
| 4,853,821 A | 8/1989 | Lewis | 361/92 |
| 5,144,207 A | 9/1992 | Brunson | 315/291 |
| 5,525,948 A | 6/1996 | Poulsen | 335/128 |
| 5,563,756 A | 10/1996 | Ignasiak | 361/42 |
| 5,920,131 A | 7/1999 | Platt et al. | 307/104 |
| 5,993,039 A | 11/1999 | Crill | 364/184 |
| 6,166,525 A * | 12/2000 | Crook | 322/11 |
| 6,208,042 B1 * | 3/2001 | Solis | 307/125 |
| 6,394,191 B1 * | 5/2002 | Nakane | 173/217 |

\* cited by examiner

*Primary Examiner*—Brian Sircus
*Assistant Examiner*—Dru Parries
(74) *Attorney, Agent, or Firm*—Gordon & Jacobson, P.C.

(57) ABSTRACT

An improved electrical lockout mechanism includes a first connection means to a power source, and a second connection means to a power input terminal of the machine being protected. The machine includes a manually-operated ON/OFF switch. A switching element, which is coupled between the first and second connection means, selectively completes and breaks an electrical circuit between the first and second connection means in response to a control signal supplied thereto. A control circuit generates this control signal in a manner that prevents unwanted machine restarts. The switching element may be realized by an electromagnetic relay device, or by a thyristor-based switching device such as a triac device. The electrical lockout mechanism can be integrated with a power cord that delivers electrical power to a machine, or can be integrated into the machine itself.

45 Claims, 3 Drawing Sheets

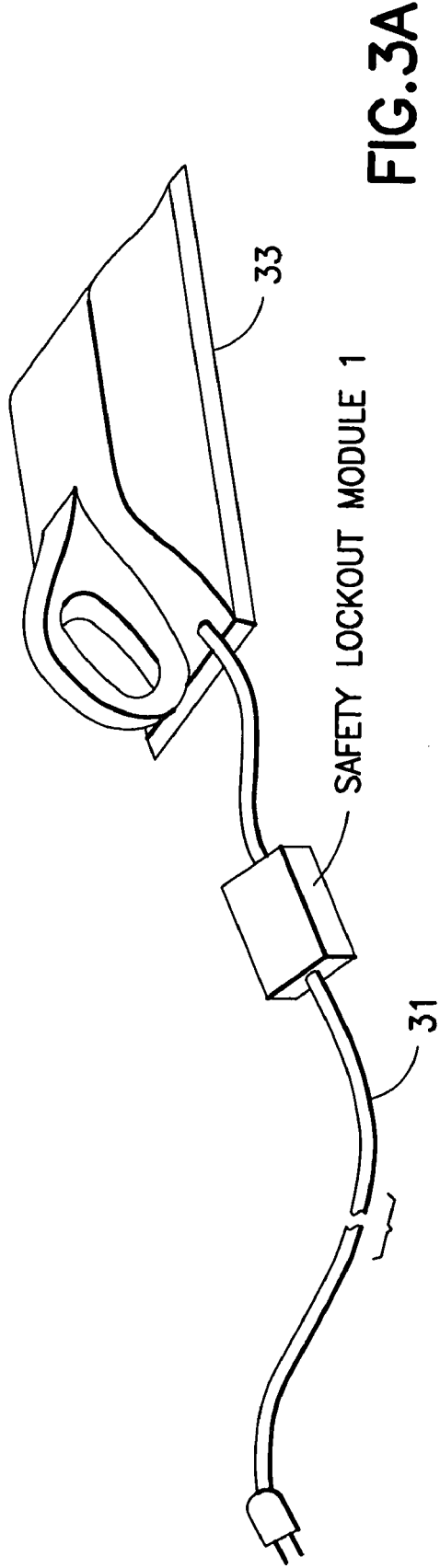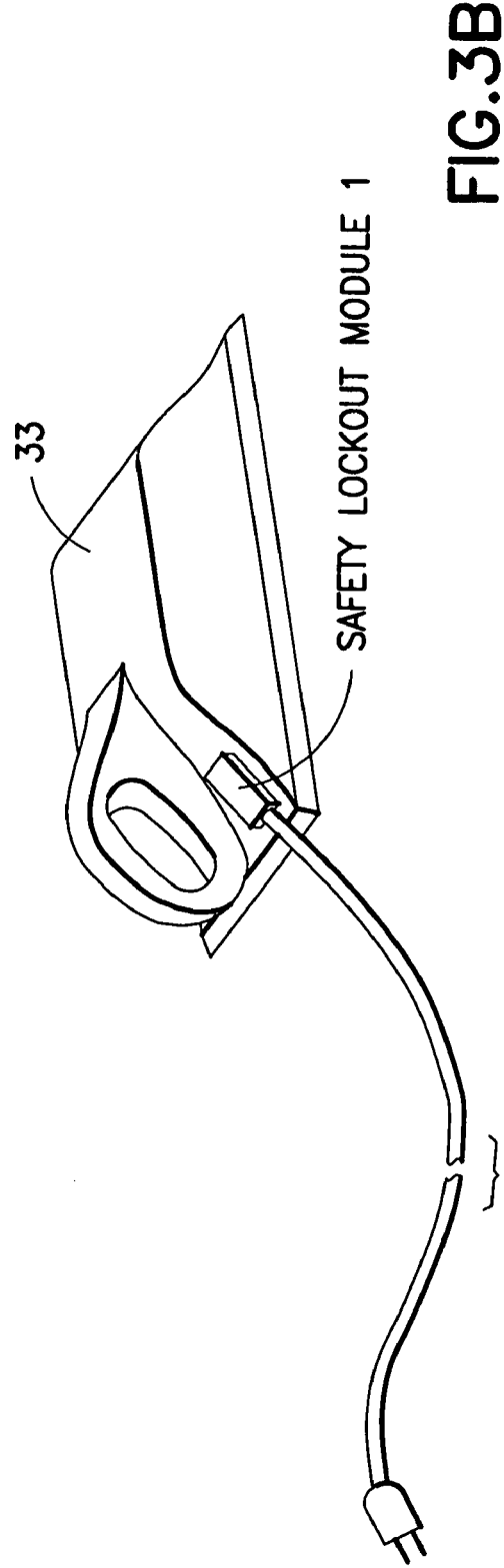
FIG.3A
FIG.3B

ELECTRICAL SAFETY LOCKOUT MECHANISM FOR POWER TOOLS AND OTHER HAZARDOUS MACHINERY

This application claims priority to U.S. Provisional Patent No. 60/348,788, filed on Jan. 14, 2002, herein incorporated by reference in its entirety.

BACKGROUND OF THE INVENTION

1. Field of the Invention

This invention relates to mechanisms that prevent the automatic turn-on of hazardous machinery upon inadvertent interruption and subsequent supply of electrical power to the machinery.

2. State of the Art

Hazardous machinery such as hand-operated power tools (e.g., routers, planers, saws, etc) and food slicers and mixers typically have an integral ON-OFF toggle switch that is manually-controlled by the operator. A safety issue arises when power to the machinery is unintentionally interrupted while the machinery is being operated (for example, caused by the power plug of the machine being accidentally pulled from its outlet or a failure of the mains power) and then the machine restarts unintentionally when power is restored and the ON-OFF toggle switch remains on.

U.S. Pat. No. 4,258,368 proposes a mechanism to deal with this problem. This mechanism includes a triac switch S2 and run switch S3 that cooperate to ensure that the machine's motor does not restart unintentionally when power is interrupted and subsequently restored and the ON-OFF toggle switch S1 remains on. More specifically, the triac switch S2 is activated during normal operation of the motor by a control signal generated by a pickup coil magnetically coupled to a rotor assembly of the motor. The run switch S3, which is normally-open and manually-actuated, provides a shunt path around the triac switch S2 when the run switch S3 is momentarily closed. The mechanism works as follows. When the machine is plugged into a working wall receptacle, the machine's motor is energized by closing the toggle switch S1 and then closing the run switch S3. When switch S3 is closed, the triac switch S2 is shunted and current flows through the lead to a pickup coil, which energizes the main winding and starter winding of the motor. As soon as current begins to flow though the main winding, a voltage signal is induced in the pickup coil which closes the triac switch S2. With the triac switch S2 closed, the motor operates normally regardless of the release of the run switch S3. When power is inadvertently interrupted and subsequently supplied to the machine, the triac switch S2 prevents automatic startup of the motor. To restart the motor, the operator must ensure that the toggle switch S1 is ON (closed) and then must manually actuate the run switch S3 so as to shunt the triac switch S2 to thereby enable the motor to start. This mechanism has many disadvantages. First, it requires that an additional coil (the pickup coil) be added to the motor, which is expensive to implement in new products and is difficult to integrate as an add-on to existing products. Moreover, it is cumbersome to use, requiring the operator to manipulate both the ON/OFF switch S1 and the run switch S3 to start and restart the motor.

Thus, there remains a need in the art for an improved electrical lockout mechanism that prevents such unintentional machine restarts yet minimizes the tasks performed by the operator under normal operating conditions. Moreover, there remains a need in the art for an improved electrical lockout mechanism that is easily and inexpensively adapted for use in both new products and existing devices.

SUMMARY OF THE INVENTION

It is therefore an object of the invention to provide an improved electrical lockout mechanism that prevents unintentional machine restarts yet minimizes the tasks performed by the operator under normal operating conditions.

It is another object of the invention to provide an improved electrical lockout mechanism that is easily and inexpensively adapted for use in both new products and existing devices.

It is a further object of the invention to provide an improved electrical lockout mechanism that is easily and inexpensively adapted for use in a power tool or other hazardous electrical appliance.

It is also an object of the invention to provide an improved electrical lockout mechanism that is readily reset (or overridden) to resume normal operation of the protected machine.

In accord with these objects, which will be discussed in detail below, an improved electrical lockout mechanism is provided that includes a first connection means to a power source, and a second connection means to the power input terminal of the machine being protected. A switching element is operably coupled between the first and second connection means. The switching element is adapted to selectively complete and break an electrical circuit between the first and second connection means in response to a control signal supplied thereto. A control circuit generates a control signal that is supplied to the switching element thereby causing the switching element to complete the electrical circuit between the first and second connection means under a first set of operating conditions and causing the switching element to break the electrical circuit between the first and second connection means under a second set of operating conditions in a manner that prevents unwanted machine restarts.

According to one embodiment of the invention, the switching element is realized by an electromagnetic relay device.

According to another embodiment of the invention, the switching element is realized by a thyristor-based switching device such as a triac device.

It will be appreciated that the electrical lockout module can be integrated with a power cord that delivers electrical power to a machine, or can be integrated into the machine itself.

Additional objects and advantages of the invention will become apparent to those skilled in the art upon reference to the detailed description taken in conjunction with the provided figures.

BRIEF DESCRIPTION OF THE DRAWINGS

FIG. 3A is a pictorial illustration of the safety lockout module connected to and integrated with a power cord that delivers electrical power to an exemplary power tool (e.g., hand-held planer) in accordance with the present invention.

FIG. 3B is a pictorial illustration of the safety lockout module integrated into an exemplary power tool (e.g., hand-held planer) in accordance with the present invention.

DETAILED DESCRIPTION OF THE PREFERRED EMBODIMENTS

In accordance with the present invention, a safety lockout module is connected to and integrated with a power cord that delivers electrical power to a machine. Alternatively, the safety lockout module can be integrated into the machine itself. The safety lockout module includes an electrical switching circuit that prevents the machine from restarting under the above described circumstance. To restart the machine once it has been locked out, the operator must turn off (e.g., open) the machine's manually-operated ON/OFF switch and then turn the same switch on (e.g., closed) again. Importantly, the electrical switching circuit introduces no additional user-operator functions, hence it does not have to be accessible to the operator. A further benefit of the electrical switching circuit is its modular nature, which enables it to be adapted to any machine with little or no modification to the machine itself. For example, the electrical switching circuit can be added to an existing machine by electrically inserting the module that realizes the circuit into the power cord of the machine.

The safety lockout module of the present invention includes the following components:

a) first connection means to a power source;

b) second connection means to the power input terminal of the machine being protected;

c) a switching element (which can be realized, for example, by an electromagnetic relay or a thyristor-based switching device such as a triac device) that is operably coupled between the first and second connection means; the switching element is adapted to selectively complete and break an electrical circuit between the power source and the power input terminal in response to a control signal supplied thereto; and d) a control circuit that generates a control signal that is supplied to the switching element thereby causing the switching element to complete the electrical circuit between the power source and the power input terminal under a first set of operating conditions and causing the switching element to break the electrical circuit between the power source and the power input terminal under a second set of operating conditions in a manner that prevents unwanted machine restarts.

Figure 1:
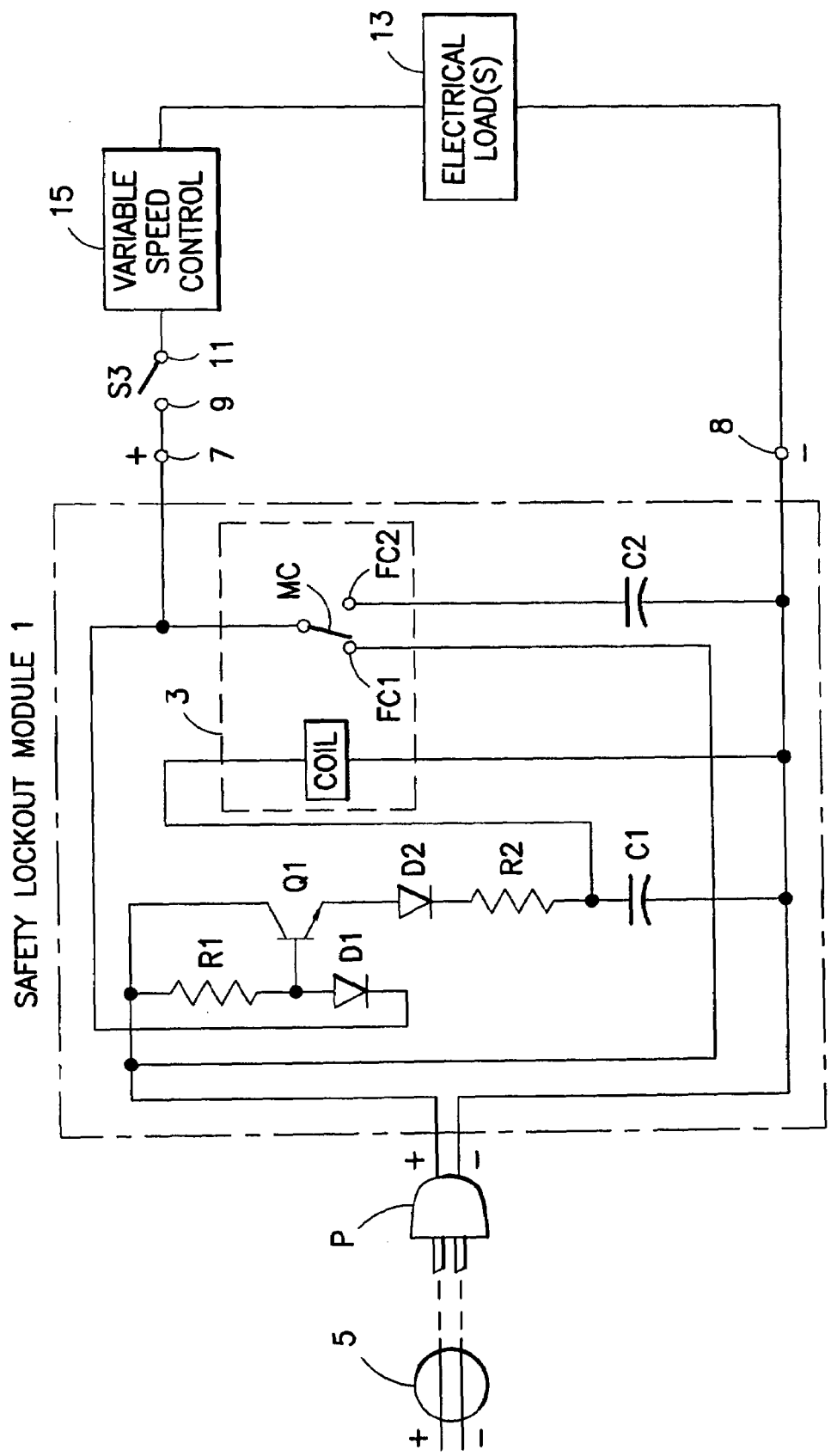
FIG. 1 is a schematic diagram illustrating a first embodiment of an exemplary safety lockout module 1 in accordance with the present invention.

Turning now to FIG. 1, there is shown a schematic diagram that illustrates a first embodiment of the safety lockout module 1 in accordance with the present invention. In this exemplary embodiment, the switching element is realized by an electromagnetic relay device 3 that selectively completes (and breaks) the circuit between the positive terminal (+) of the power plug P and the positive input terminal 7 of the machine in response to a control signal supplied to the coil of the relay 3 as shown. Note that the neutral terminal (−) of the power plug P is operably coupled to the neutral input terminal 8 of the machine by a common neutral bus line, and that the positive terminal (+) and the neutral terminal (−) of the power plug P are operably coupled to the positive terminal (+) and the negative terminal (−), respectively, of the power source 5 (e.g., a wall outlet or generator outlet) as shown. In addition, the positive input terminal 7 of the machine is operably coupled to the input 9 of the machine's ON/OFF switch S3, and one or more electrical loads 13 of the machine are operably coupled between the output 11 of switch S3 and the negative input terminal 8 as shown.

The electrical load(s) 13 of the machine may comprise one or more electrical AC motors, one or more electrically-controlled hydraulic actuators, an electric heating device, etc. Electrical AC motors are typically used to drive a rotating or reciprocating element (such as a saw, drill) to thereby realize a power tool, or may be used to drive a rotating blade/mixing element to realize a food slicer/mixer. For motor-based machines, control circuitry 15 may be provided that employs gate controlled switching devices to provide for variable speed control of motor as is well know in the art. Typically, such variable speed control circuitry 15 is operably disposed between the ON/OFF switch S3 and the motor-based load(s) 13 as shown. The machine's ON/OFF switch S3 is manually-switched by the operator from an OFF/non-conducting state to an ON/conducting-state, where it remains until manually-switched back to the OFF/non-conducting state by the operator. Typcially, switch S3 is realized by a manually-operated toggle switch.

The control circuit of the exemplary safety lockout module 1 of FIG. 1 includes a plurality of series-coupled elements that form a switchable current path between the positive (+) input terminal of the power source 5 and the input terminal to the coil of the relay 3 as shown. This current path is activated (e.g., placed in ON/conducting state) when power is applied at plug P and the machine's ON/OFF switch S3 is OFF; however, the current path is not activated (e.g., placed in OFF/non-conducting state) when power is applied at plug P and the machine's ON/OFF switch S3 is ON. Preferably, the series-coupled elements that form the switchable current path include a transistor Q1, diode D2 and resistor R2 as shown. In this configuration, the current path is activated by current supplied to the base of transistor Q1 via resistor R1. More specifically, resistor R1 has a high ohmic value (preferably, on the order of 100 kohms) such that when power is applied to the plug P and machine's ON/OFF switch S3 is OFF, sufficient current is generated across R1 and provided to the base of transistor Q1 such the transistor Q1 is forward biased, thereby causing a larger current to flow from the emitter of transistor Q1 through the diode D2 and resistor R2 (preferably on the order of 5 kohms) and to the coil of relay 3. This current energizes the relay 3, thereby connecting the moving contact MC to the fixed contact FC1 to complete the power circuit to the power input terminal 7 of the machine. The relay 3 remains energized as long as power is available at plug P. Note that the transistor Q1 and the relay 3 are polar devices; thus, if AC power is provided at plug P, currents will flow through the transistor Q1 and relay 3 only during the positive half of the AC power cycle. Therefore, in order to maintain the relay 3 in its energized state during the negative half of an AC power cycle, an energy storage capacitor C1 (preferably an electrolytic capacitor on the order of 5 microfarads) is coupled between the input terminal of the coil and the common neutral bus as shown. Note that blocking diodes D1 and D2 are provided to protect against reverse voltages and currents.

Now, in the event that power to the plug P is cut off for any reason (e.g., the plug P is inadvertently pulled from the source 5 or the power mains fail), the switchable current path (e.g., the transistor Q1) is placed in the OFF/non-conducting condition and the relay 3 will de-energize, thereby disconnecting the moving contact MC from the fixed contact FC1 to break the power circuit to the power input terminal 7 of the machine and preferably connecting the moving contact MC to the fixed contact FC2.

Subsequently, when power is restored to plug P and the machine's ON/OFF switch S3 is ON, the switchable current path remains OFF and the relay 3 will not energize, thereby maintaining the contact between MC and FC2 such that the power circuit to the power input terminal 7 of the machine is broken. In the configuration shown, this is accomplished by shunting the small current through R1 to neutral potential by the impedance of the electrical load(s) 13 of the machine; hence, there will be no current to forward bias transistor Q1 and relay 3 will not energize. Note that this small current is insufficient to start operation of the electrical load(s) of the machine. Thus, the machine is locked-out until such time as the operator turns the machine's ON/OFF switch S3 OFF. Once this occurs, the machine can be operated in the normal fashion as described above by turning switch S3 ON.

In the preferred configuration shown in FIG. 1, the relay 3 is a single-pole double-throw relay that includes two fixed contacts FC1 and FC2. As described above, the contact FC1 is used to complete (and break) the power circuit between the positive terminal (+) of the plug P and the positive input power terminal 7 of the machine. The contact FC2 is used to connect capacitor C2 to the current path through R1 and D1 when the relay 3 is de-energized in order to prevent the voltage at the base of transistor Q1 from rising to undesired levels when switch S3 is closed and the relay 3 is de-energized. More specifically, when the relay 3 is de-energized, power is applied at plug P, and switch S3 is ON, the current through R1 and D1 is shunted to neutral potential through switch S3 and the electrical load (13). As described above, the machine may optionally include, in addition to the ON/OFF switch S3, variable speed power control circuitry 15 that employs gate-controlled switching devices which cause the machine to present a complex periodic impedance profile to its power source. When the relay device 3 is operating in the non-conducting/OFF (i.e., the machine's lockout mode) and the switch S3 is ON, the periodic high impedance peaks potentially cause the base voltage at transistor Q1 to rise. If the base voltage of transistor Q1 increases to a point that causes Q1 to become forward biased, a larger current will flow through the coil and energize the relay 3, thereby allowing the machine to inadvertently restart. Coupling the capacitor C2 to the shunting current path avoids these problems by preventing the unwanted voltage rise at the base of transistor Q1. Note that variable speed control circuit 15 is optional. If it is not used, the second contact FC2 of relay 3 and the corresponding capacitor C2 are not required; hence a single throw (e.g., single contact) relay device may be used.

Figure 2:
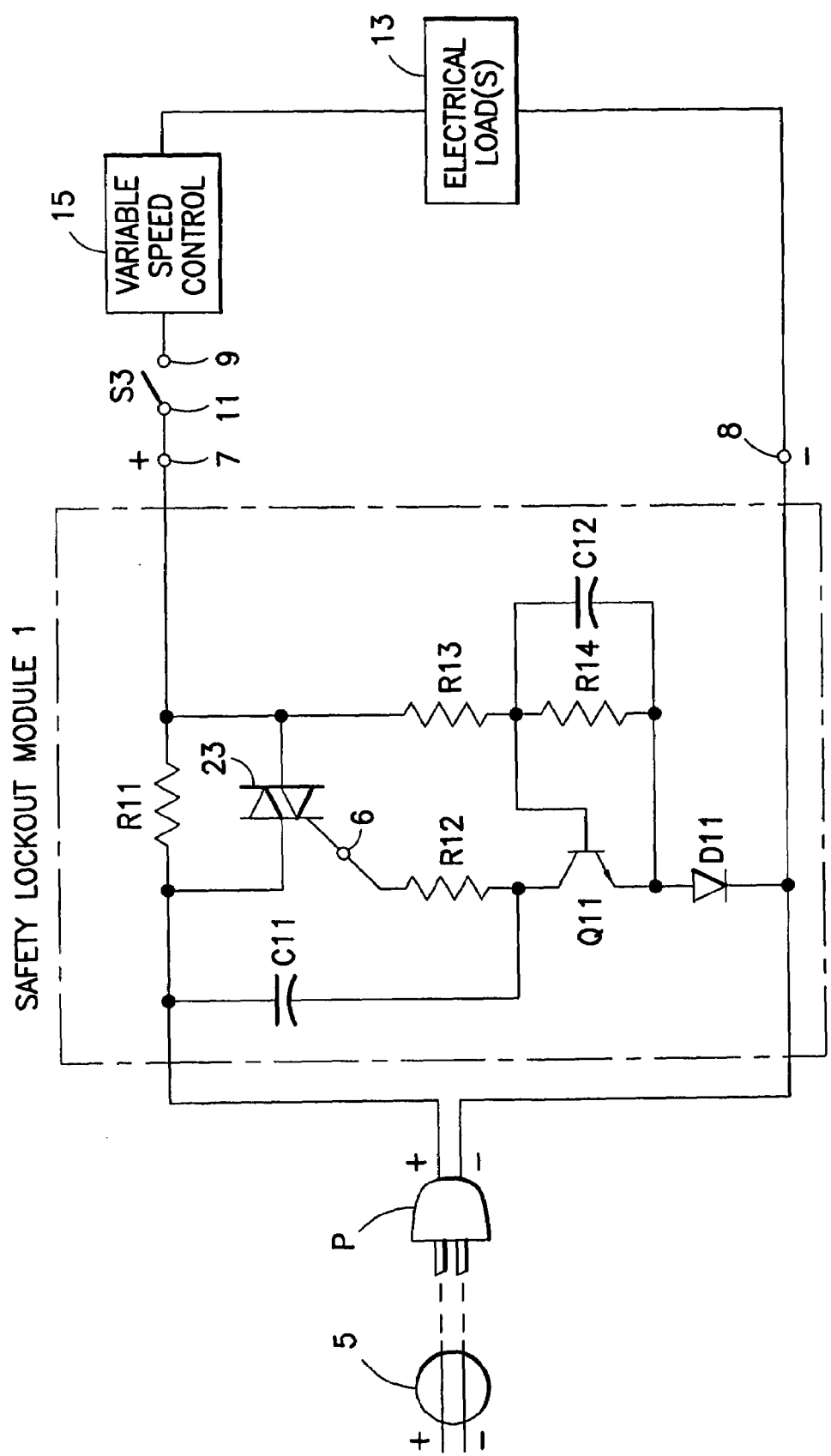
FIG. 2 is a schematic diagram illustrating a second embodiment of an exemplary safety lockout module 1 in accordance with the present invention.

Turning now to FIG. 2, there is shown a schematic diagram that illustrates a second embodiment of the safety lockout module 1 in accordance with the present invention. In this exemplary embodiment, the switching element is realized by a triac device 23 that selectively completes (and breaks) the circuit between the positive terminal (+) of the power plug P and the positive input terminal 7 of the machine in response to a control signal supplied to the gate electrode of the triac 23 as shown. Note that the neutral terminal (−) of the power plug P is operably coupled to the neutral input terminal 8 of the machine by a common neutral bus line as shown, and that the positive terminal (+) and the neutral terminal (−) of the power plug P are operably coupled to the positive terminal (+) and the negative terminal (−), respectively, of the power source 5 (e.g., a wall outlet or generator outlet) as shown. In addition, the positive input terminal 7 of the machine is operably coupled to the input 9 of the machine's ON/OFF switch S3, and one or more electrical loads 13 of the machine are operably coupled between the output 11 of switch S3 and the negative input terminal 8 as shown. The machine's ON/OFF switch S3 is manually-switched by the operator from an OFF/non-conducting state to an ON/conducting-state, where it remains until manually-switched back to the OFF/non-conducting state by the operator.

As described above, the electrical load(s) 13 may comprise one or more electrical AC motors, one or more electrically-controlled hydraulic actuators, an electric heating device, etc. For motor-based machines, control circuitry 15 may be provided that employs gate controlled switching devices to provide for variable speed control of motor as is well know in the art.

The control circuit of the exemplary safety lockout module 1 of FIG. 2 includes a plurality of series-coupled elements that form a switchable current path between the neutral (−) input terminal of the power source 5 and the gate terminal of the triac 23 (sometimes referred to as a bidirectional thyristor) as shown. This current path is activated (e.g., placed in ON/conducting state) when power is applied at plug P and the machine's ON/OFF switch S3 is OFF; however, the current path is not activated (e.g., placed in OFF/non-conducting state) when power is applied at plug P and the machine's ON/OFF switch S3 is ON. Preferably, the series-coupled elements that form the switchable current path include a resistor R12, transistor Q11, and diode D11 as shown. In this configuration, the current path is activated by current supplied to the base of transistor Q11 by the resistors R11, R13 and resistor R14 as shown. More specifically, resistor R11 has a high ohmic value (preferably, on the order of 100 kohms) such that when power is applied to the plug P and machine's ON/OFF switch S3 is OFF, sufficient current is generated across the resistor network R11, R13 and R14 and provided to the base of transistor Q11 such the transistor Q11 is forward biased, thereby causing a larger current to flow between the gate of the triac 23 through the switchable current path (e.g., resistor R12, transistor Q11, diode D11) to the common neutral bus. This current causes the triac 23 to switch to a conducting/ON state, thereby completing the power circuit to the power input terminal 7 of the machine. The triac 23 remains in the conducting/ON state as long as power is available at plug P and there is a DC current flowing through the gate electrode of the triac 23. The resistor R12 serves to limit the current flowing through the gate electrode of the triac 23 to the desired levels. The resistors R13 and R14 serve as a voltage divider which in combination with R11 determines the threshold at which transistor Q11 begins to conduct. Note that the transistor Q11 is a polar device; thus, if AC power is provided at plug P, currents will flow through the transistor Q11 only during the positive half of the AC power cycle. Therefore, in order to maintain the triac 23 in its conducting/ON state during the negative half of an AC power cycle, an energy storage capacitor C11 (preferably an electrolytic capacitor on the order of 5 microfarads) is coupled between the positive terminal (+) of the plug P and the collector terminal of transistor Q11 as shown. Note that blocking diode D11 is provided to protect against reverse voltages and currents.

Now, in the event that power to the plug P is cut off for any reason (e.g., the plug P is inadvertently pulled from the source 5 or the power mains fail), the switchable current path (e.g., the transistor Q11) is placed in the OFF/non-conducting condition and the triac 23 will switch into an OFF/non-conducting state, thereby breaking the power circuit to the power input terminal 7 of the machine.

Subsequently, when power is restored to plug P and the machine's ON/OFF switch S3 is ON, the switchable current path remains OFF and the triac 23 will not switch into its ON/conducting state, thereby maintaining its OFF state that breaks the power circuit to the power input terminal 7 of the machine. In the configuration shown, this is accomplished by shunting the small current through R11 to neutral potential by the impedance of the electrical load(s) 13 of the machine; hence, there will be no current to forward bias transistor Q11 and the triac 23 is not switched ON. Thus, the machine is locked-out until such time as the operator turns the machine's ON/OFF switch S3 OFF. Once this occurs, the machine can be operated in the normal fashion as described above by the operator manually turning switch S3 ON.

In the preferred configuration of FIG. 2, an optional capacitor C12 is provided in parallel to resistor R14. Capacitor C12 prevents the voltage at the base of transistor Q11 from rising to undesired levels when power is applied to plug P, switch S3 is closed and the triac device 23 is operating in the non-conducting/OFF state. More specifically, under these condition, the current through R11 is shunted to neutral potential through switch S3 and the electrical load (13). As described above, the machine may optionally include, in addition to the ON/OFF switch S3, variable speed power control circuitry 15 that employs gate-controlled switching devices which cause the machine to present a complex periodic impedance profile to its power source. When the triac device 23 is operating in the non-conducting/OFF (i.e., the machine's lockout mode) and the switch S3 is ON, the periodic high impedance peaks potentially cause peaks in the base voltage at transistor Q11. If the base voltage of transistor Q11 increases to a point that causes Q11 to become forward biased, a larger current will flow through Q11 and switch the triac 23 into the conducting/ON state, thereby allowing the machine to inadvertently restart. Coupling the capacitor C12 in parallel with resistor R14 avoids these problems by preventing the unwanted voltage rise at the base of transistor Q11. Note that variable speed control circuit 15 is optional. If it is not used, the capacitor C12 and its associated current path parallel to R14 are not required.

As shown in FIG. 3A, the safety lockout module of the present invention (examples of which are described above with respect to FIG. 1 and FIG. 2) may be connected to and integrated with a power cord 31 that delivers electrical power to a machine 33, such as a hand-held planer power tool as shown. In this configuration, one end of the power cord 31 is connected to and integral with the planer 33 as shown. Alternatively, as shown in FIG. 3B, the safety lockout module 1 of the present invention can be integrated into the machine 33 itself.

Advantageously, the safety lockout mechanism of the present invention utilizes low cost circuitry to prevent the inadvertent restart of a machine. To restart the machine once it has been locked out, the operator must turn off (e.g., open) the machine's ON/OFF switch and then turn the same switch on (e.g., closed) again. Importantly, the electrical switching circuit introduces no additional user-operator functions, hence it does not have to be accessible to the operator. A further benefit of the electrical switching circuit is its modular nature, which enables it to be adapted to any machine with little or no modification to the machine itself. For example, the electrical switching circuit can be added to an existing machine by electrically inserting the module that realizes the circuit into the power cord of the machine.

There have been described and illustrated herein several embodiments of an electrical safety lockout mechanism that prevents the inadvertent restart of a machine. While particular embodiments of the invention have been described, it is not intended that the invention be limited thereto, as it is intended that the invention be as broad in scope as the art will allow and that the specification be read likewise. Thus, while particular electrical device-types and components have been disclosed, it will be appreciated that other electrical device-types and components can be used as well. For example, and not by way of limitation, alternate power switching elements—such as one or more FET-type transistors (e.g., a MOSFET-type transistor or JFET-type transistor)—can be used. Also, while several preferred applications of the safety lockout mechanism have been disclosed, it will be recognized that the mechanism is applicable to a broad range of applications that require the lockout of a hazardous machine. It will therefore be appreciated by those skilled in the art that yet other modifications could be made to the provided invention without deviating from its spirit and scope as claimed.

What is claimed is:

1. In a system including an alternating current electrical power source and an electrically-operated machine, said electrical power source having first and second power supply terminals, and said machine having at least one electrical load, first and second power supply inputs that are operably coupled to said first and second power supply terminals, and a first switching device operably disposed between one of said first and second power supply inputs and said at least one electrical load, said first switching device manually-operated between one of an ON state and OFF state, wherein in said ON state electrical power supplied to said first and second power supply inputs passes through said first switching device for powering said at least one electrical load, and wherein in said OFF state electrical power supplied to said first and second power supply inputs does not pass through said first switching device such that power is not provided to said at least one electrical load, an apparatus for controlling supply of electrical power provided by said electrical power source to said machine, the apparatus comprising:

a second switching device operably coupled between a given one of said first and second power supply inputs and a corresponding one of said first and second power supply terminals of said electrical power source, said second switching device having a control node for selectively controlling said second switching device into one of a conducting-state and non-conducting state in response to control signals supplied thereto; and a plurality of circuit elements, operably coupled to said control node of said second switching device, that generate a control signal that operates said second switching device in said non-conducting state when i) said electrical power source removes and subsequently supplies electrical power to said first and second power supply terminals and ii) said first switching device is manually-operated in said ON state concurrent with said electrical power source subsequently supplying electrical power to said first and second power supply terminals, to thereby isolate said machine from said electrical power source and prevent hazardous turn-on of said machine;

wherein said plurality of circuit elements comprise a switchable current path leading to said control node of said second switching device said switchable current path being selectively turned OFF and ON in accordance with state of said first switching device, and said switchable current path including a current path through at least one transistor whose control electrode is electrically connected to a shunt current path leading to said first switching device.

2. The apparatus according to claim 1, wherein:
said plurality of circuit elements generate a control signal that operates said second switching device in a conducting state when i) said electrical power source resupplies electrical power to said first and second power supply terminals and concurrently ii) said first switching device is manually-operated in said OFF state.

3. The apparatus according to claim 1, wherein:
said plurality of circuit elements generate a control signal that operates said second switching device in a non-conducting state when said electrical power source does not supply electrical power to said first and second power supply terminals.

4. The apparatus according to claim 1, wherein:
said plurality of circuit elements generate a control signal that operates said second switching device in a non-conducting state when i) said electrical power source resupplies electrical power to said first and second power supply terminals and concurrently ii) said first switching device is manually-operated in said ON state.

5. The apparatus according to claim 1, wherein:
said shunt current path carries current that is insufficient to power on said at least one electrical load of said machine.

6. The apparatus according to claim 1, further comprising:
a capacitor that stores energy to maintain said second switching element in a conducting state during negative power cycles.

7. The apparatus according to claim 1, wherein:
said switchable current path further includes at least one resistor.

8. The apparatus according to claim 1, wherein:
said plurality of circuit elements further include at least one resistor coupled between a given one of said first and second power supply terminals and said control electrode of said transistor.

9. The apparatus according to claim 8, wherein:
said plurality of circuit elements further include a blocking diode between said control electrode of said transistor and an output of said second switching element.

10. The apparatus according to claim 9, wherein:
said plurality of elements further include a switched capacitor that is switchably coupled between the output of said second switching element and another one of said first and second power supply terminals when said second switching element is operating in said non-conducting state, and that is switchably decoupled from the output of said second switching element when said second switching element is operating in said conducting state.

11. The apparatus according to claim 10, wherein:
said second switching element comprises a single-pole double-throw electromagnetic relay device, said control node operably coupled to a coil of said relay device, said given one of said first and second power supply terminals operably coupled to a first fixed contact of said relay device, said output of said second switching element operably coupled to a moving contact of said relay device, and said switched capacitor operably coupled to a second fixed contact of said relay device.

12. The apparatus according to claim 8, wherein:
said switchable current path extends between said control node of said second switching device and another one of said first and second power supply terminals.

13. The apparatus according to claim 12, wherein:
said switchable current path includes a blocking diode.

14. The apparatus according to claim 12, wherein:
said switchable current path further includes at least one resistor.

15. The apparatus according to claim 12, wherein:
said plurality of circuit elements further include a plurality of resistors coupled in series between said given one of said first and second power supply terminals and said control electrode of said transistor.

16. The apparatus according to claim 15, wherein:
said plurality of elements further include a resistor and capacitor coupled in parallel between said control electrode of said transistor and said switchable current path.

17. The apparatus according to claim 1, wherein:
said second switching element comprises an electromagnetic relay device having a coil, said control node being operably coupled to said coil.

18. The apparatus according to claim 1, wherein:
said second switching element comprises a triac device having a gate electrode, said control node comprising said gate electrode.

19. The apparatus according to claim 1, wherein:
said machine comprises a power tool.

20. The apparatus according to claim 1, wherein:
said machine comprises a hazardous food preparation device.

21. The apparatus according to claim 1, wherein:
said at least one electrical load of said machine includes an electric AC motor.

22. The apparatus according to claim 1, wherein:
said second switching device and said plurality of circuit elements are mounted onto at least one printed circuit board that is disposed within a housing integral to a power cord assembly that is connected to said machine.

23. The apparatus according to claim 1, wherein:
said second switching device and said plurality of circuit elements are mounted onto at least one printed circuit board that is disposed within a housing integral to said machine.

24. A machine for use with an alternating current electrical power source having first and second power supply terminals, said machine comprising:
at least one electrical load;
a first switching device having an input and output, said output operably coupled to said at least one electrical load, said first switching device manually-operated between one of an ON state and OFF state, wherein in said ON state electrical power supplied to said input is output by said first switching device for supply to said at least one electrical load, and wherein in said OFF state the output of said first switching device is electrically isolated from the input of said first switching device such that power is not provided to said at least one electrical load;
a second switching device operably coupled between a given one of said first and second power supply terminals and said input of said first switching device, said second switching device having a control node for selectively controlling said second switching device into one of a conducting-state and non-conducting state in response to control signals supplied thereto; and a plurality of circuit elements, operably coupled to said control node of said second switching device, that generate a control signal that operates said second switching device in said non-conducting state when i) said electrical power source removes and subsequently supplies electrical power to said first and second power supply terminals and ii) said first switching device is manually-operated in said ON state concurrent with said electrical power source subsequently supplying electrical power to said first and second power supply terminals, to thereby isolate said at least one electrical load of said machine from said electrical power source and prevent hazardous turn-on of said machine;

wherein said plurality of circuit elements comprise a switchable current path leading to said control node of said second switching device, said switchable current path being selectively turned OFF and ON in accordance with state of said first switching device, and said switchable current path including a current path through at least one transistor whose control electrode is electrically connected to a shunt current path leading to said first switching device.

25. The machine according to claim 24, wherein:
said plurality of circuit elements generate a control signal that operates said second switching device in a conducting state when i) said electrical power source resupplies electrical power to said first and second power supply terminals and concurrently ii) said first switching device is manually-operated in said OFF state.

26. The machine according to claim 24, wherein:
said plurality of circuit elements generate a control signal that operates said second switching device in a non-conducting state when said electrical power source does not supply electrical power to said first and second power supply terminals.

27. The machine according to claim 24, wherein:
said plurality of circuit elements generate a control signal that operates said second switching device in a non-conducting state when i) said electrical power source resupplies electrical power to said first and second power supply terminals and concurrently ii) said first switching device is manually-operated in said ON state.

28. The apparatus according to claim 24, wherein:
said shunt current path carries current that is insufficient to power on said at least one electrical load of said machine.

29. The machine according to claim 24, further comprising:
a capacitor that stores energy to maintain said second switching element in a conducting state during negative power cycles.

30. The machine according to claim 24, wherein:
said switchable current path further includes at least one resistor.

31. The machine according to claim 24, wherein:
said plurality of circuit elements further include at least one resistor coupled between a given one of said first and second power supply terminals and said control electrode of said transistor.

32. The machine according to claim 31, wherein:
said plurality of circuit elements further include a blocking diode between said control electrode of said transistor and an output of said second switching element.

33. The machine according to claim 32, wherein:
said plurality of elements further include a switched capacitor that is switchably coupled between the output of said second switching element and another one of said first and second power supply terminals when said second switching element is operating in said non-conducting state, and that is switchably decoupled from the output of said second switching element when said second switching element is operating in said conducting state.

34. The machine according to claim 33, wherein:
said second switching element comprises a single-pole double-throw electromagnetic relay device, said control node operably coupled to a coil of said relay device, said given one of said first and second power supply terminals operably coupled to a first fixed contact of said relay device, said output of said second switching element operably coupled to a moving contact of said relay device, and said switched capacitor operably coupled to a second fixed contact of said relay device.

35. The machine according to claim 31, wherein:
said switchable current path extends between said control node of said second switching element and another one of said first and second power supply terminals.

36. The machine according to claim 35, wherein:
said switchable current path includes a blocking diode.

37. The machine according to claim 35, wherein:
said switchable current path further includes at least one resistor.

38. The machine according to claim 35, wherein:
said plurality of circuit elements further include a plurality of resistors coupled in series between said given one of said first and second power supply terminals and said control electrode of said transistor.

39. The machine according to claim 38, wherein:
said plurality of elements further include a resistor and capacitor coupled in parallel between said control electrode of said transistor and said switchable current path.

40. The machine according to claim 24, wherein:
said second switching element comprises an electromagnetic relay device having a coil, said control electrode being operably coupled to said coil.

41. The machine according to claim 24, wherein:
said second switching element comprises a triac device having a gate electrode, said control electrode comprising said gate electrode.

42. The machine according to claim 24, wherein:
said machine comprising a power tool.

43. The machine according to claim 24, wherein:
said machine comprising a hazardous food preparation device.

44. The machine according to claim 24, wherein:
said at least one electrical load of said machine includes an electric AC motor.

45. The machine according to claim 24, wherein:
said second switching device and said plurality of circuit elements are mounted onto at least one printed circuit board that is disposed within a housing integral to said machine.

* * * * *